(No Model.)
O. E. WAIT.
CASTER FOR ROLLER SKATES AND FURNITURE.
No. 281,324. Patented July 17, 1883.
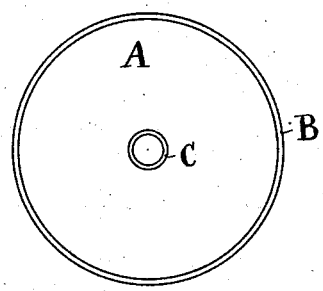
Witnesses.
L. Planta
Benj. P. Ryder
Inventor
Oscar E. Wait
by Chas H. Drew
attorney

UNITED STATES PATENT OFFICE.

OSCAR E. WAIT, OF PROVIDENCE, RHODE ISLAND.

CASTER FOR ROLLER-SKATES AND FURNITURE.

SPECIFICATION forming part of Letters Patent No. 281,324, dated July 17, 1883.

Application filed August 31, 1882. (No model.)

*To all whom it may concern:*

Be it known that I, OSCAR E. WAIT, of Providence, in the State of Rhode Island, have invented certain new and useful Improvements in Casters for Roller-Skates and Furniture, of which the following is a specification.

The object of my invention is to provide a caster which shall resist the wear to which it is subjected, have a certain degree of elasticity, make little or no noise when in use, and have a self-lubricating and durable bearing.

Casters as now ordinarily made, especially on roller-skates, are subjected to very hard usage, which in a comparatively short time wears them out, so that they have to be renewed; also, it is necessary, or very desirable, to provide some means of lubricating the bearings, which is now done in a manner much more expensive and inconvenient than that invented by me, and no means, so far as I know, exist for making the bearings durable. These difficulties are all overcome by my invention. Another advantage in the use of my casters consists in the fact that their edges will not cut the floor upon which they are used, as is the case with most of the casters now in use—such as those made of lignum-vitæ and other hard woods.

In the drawing I have shown a plan of a caster embodying my invention.

A is a wooden caster or roller of the ordinary form, made slightly smaller than the caster is designed to be when finished.

B is a band of rawhide, forming an outer covering or rim over the whole periphery of the caster. This is applied as follows: A piece of rawhide of the proper size and shape is to be softened by soaking in water. It is then to be dried until nearly all the water is expelled. It is then to be split to the proper thickness, coated with glue or other adhesive substance, preferably Russia cement. It is then to be wound, preferably twice, around the wooden roller, dried, and finished in a lathe.

C is a bushing of rawhide, placed within the hole in the center of the caster, which is to form the bearing. This bushing extends the whole length of the bearing. It is to be made as follows: A core made of wire of the proper size, having an eye in each end, is to be provided, on which a piece of rawhide, split or shaved to the proper thickness and moistened sufficiently, to make it pliant, is to be wound spirally. The object of the eyes is to hold the ends of the strip of rawhide while it is being wound. When dried the core is to be removed. The roll of rawhide is then to be coated with glue or other adhesive substance and a section of the proper length cut from it, which section is to be inserted in the hole in the center of the wooden roll; or the roll of rawhide may be first inserted and the section cut off after it has been thus put in. This bushing not only protects the caster by resisting the action of the axle, which would otherwise wear the caster away, but also, by reason of its nature, acts as a lubricator.

What I claim, and desire to secure by Letters Patent, is—

1. The improved caster composed of the roller A, the rawhide rim B, and the rawhide bushing C, substantially as above described.

2. A caster for roller-skates and furniture provided with an outer covering or rim of rawhide, substantially as above described.

3. A caster for roller-skates and furniture provided with a rawhide bushing, substantially as described.

OSCAR E. WAIT.

Witnesses:
CHAS. F. PERKINS,
CHAS. ELI DREW.